United States Patent
Tomita et al.

(10) Patent No.: US 10,857,855 B2
(45) Date of Patent: Dec. 8, 2020

(54) ABSORPTION HEAT PUMP DEVICE

(71) Applicant: AISIN SEIKI KABUSHIKI KAISHA, Kariya (JP)

(72) Inventors: Akifumi Tomita, Chiryu (JP); Osamu Tsubouchi, Chiryu (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 115 days.

(21) Appl. No.: 16/074,316

(22) PCT Filed: Jan. 27, 2017

(86) PCT No.: PCT/JP2017/002897
§ 371 (c)(1),
(2) Date: Jul. 31, 2018

(87) PCT Pub. No.: WO2017/135160
PCT Pub. Date: Aug. 10, 2017

(65) Prior Publication Data
US 2019/0210428 A1 Jul. 11, 2019

(30) Foreign Application Priority Data
Feb. 2, 2016 (JP) .................................. 2016-017888

(51) Int. Cl.
*B60H 1/32* (2006.01)
*F25B 39/02* (2006.01)
(Continued)

(52) U.S. Cl.
CPC ....... *B60H 1/3201* (2013.01); *B60H 1/00342* (2013.01); *B60H 1/32011* (2019.05);
(Continued)

(58) Field of Classification Search
CPC .............. B60H 1/00342; B60H 1/3201; B60H 1/32011
(Continued)

(56) References Cited

U.S. PATENT DOCUMENTS 5,448,895 A * 9/1995 Coellner ................ F24F 3/1411
62/271
6,629,427 B1 * 10/2003 Piao ........................ B01D 53/06
62/271
(Continued)

FOREIGN PATENT DOCUMENTS

CN 2174244 Y 8/1994
CN 101858698 A 10/2010
(Continued)

OTHER PUBLICATIONS

Office Action (The First Office Action) dated Jan. 3, 2020, by the State Intellectual Property Office of People's Republic of China in corresponding Chinese Patent Application No. 201780009345.5 and an English Translation of the Office Action. (21 pages).
(Continued)

*Primary Examiner* — Henry T Crenshaw
(74) *Attorney, Agent, or Firm* — Buchanan Ingersoll & Rooney PC

(57) ABSTRACT

An absorption heat pump device includes a heat exchange unit through which a heat exchange fluid flows, a rotor that includes a hollow rotary shaft member including a first internal flow path and discharges a solution in the first internal flow path by a centrifugal force, and an application member that moves with rotation of the rotor to apply the solution, which flows through the first internal flow path and is discharged, along a heat transfer surface of the heat exchange unit.

8 Claims, 5 Drawing Sheets

(51) Int. Cl.
*F28D 11/02* (2006.01)
*F25B 15/00* (2006.01)
*B60H 1/00* (2006.01)

(52) U.S. Cl.
CPC .............. *F25B 15/00* (2013.01); *F25B 39/02* (2013.01); *F28D 11/02* (2013.01); *Y02A 30/27* (2018.01); *Y02B 30/62* (2013.01)

(58) Field of Classification Search
USPC .......................................................... 62/271
See application file for complete search history.

(56) References Cited

U.S. PATENT DOCUMENTS

| | | | | |
|---|---|---|---|---|
| 2004/0244398 | A1* | 12/2004 | Radermacher | E03B 3/28 62/285 |
| 2013/0062794 | A1* | 3/2013 | Tsubouchi | F25B 37/00 261/140.2 |
| 2015/0168029 | A1* | 6/2015 | Tsubouchi | F25B 37/00 62/489 |
| 2018/0163999 | A1* | 6/2018 | Tsubouchi | F25B 15/14 |

FOREIGN PATENT DOCUMENTS

| | | |
|---|---|---|
| CN | 104713267 A | 6/2015 |
| JP | H04-236079 A | 8/1992 |
| JP | 2004-084995 A | 3/2004 |

OTHER PUBLICATIONS

International Search Report (PCT/ISA/210) dated Apr. 25, 2017, by the Japanese Patent Office as the International Searching Authority for International Application No. PCT/JP2017/002897.

Written Opinion (PCT/ISA/237) dated Apr. 25, 2017, by the Japanese Patent Office as the International Searching Authority for International Application No. PCT/JP2017/002897.

* cited by examiner

STATE WHERE REFRIGERANT (WATER) IS SUPPLIED TO HEAT TRANSFER SURFACE 32b OF HEAT EXCHANGER 32 VIA BRANCH MEMBER 37 (ENLARGED VIEW)

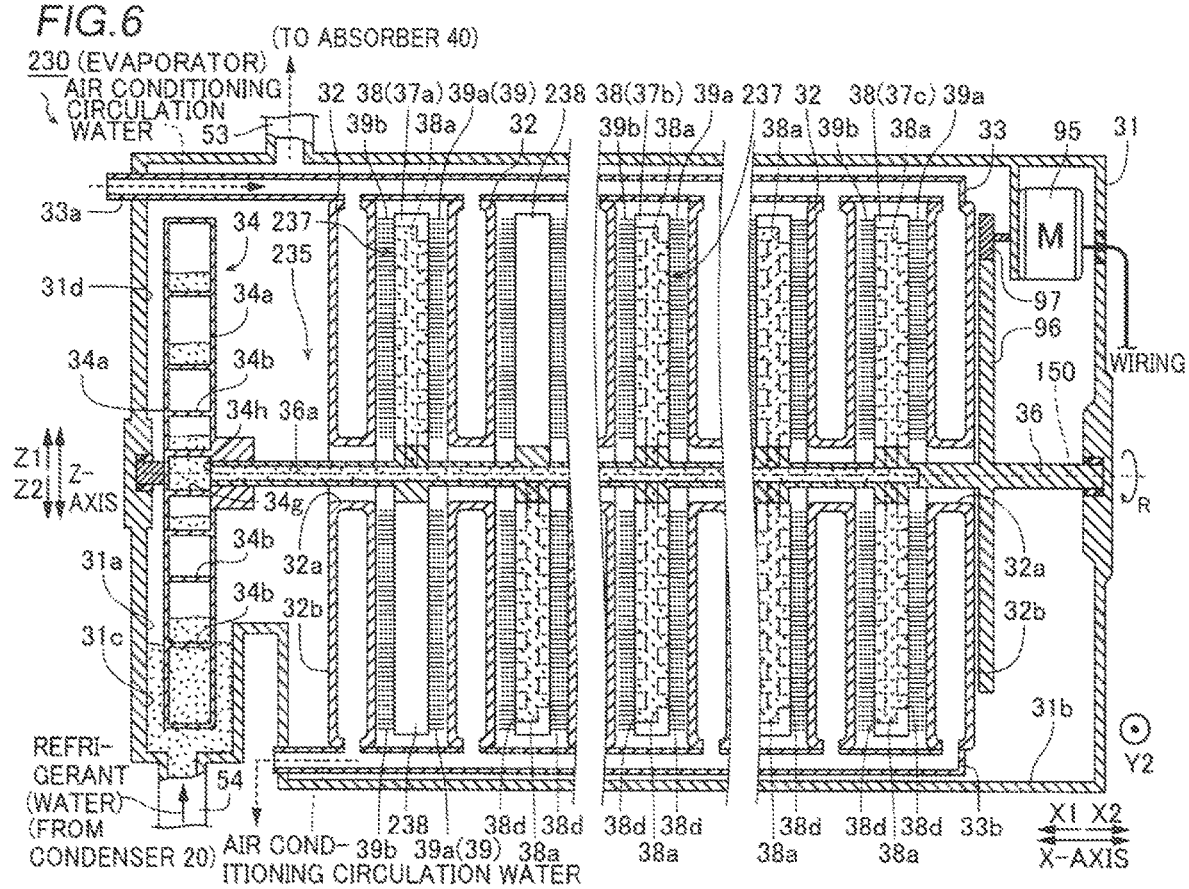
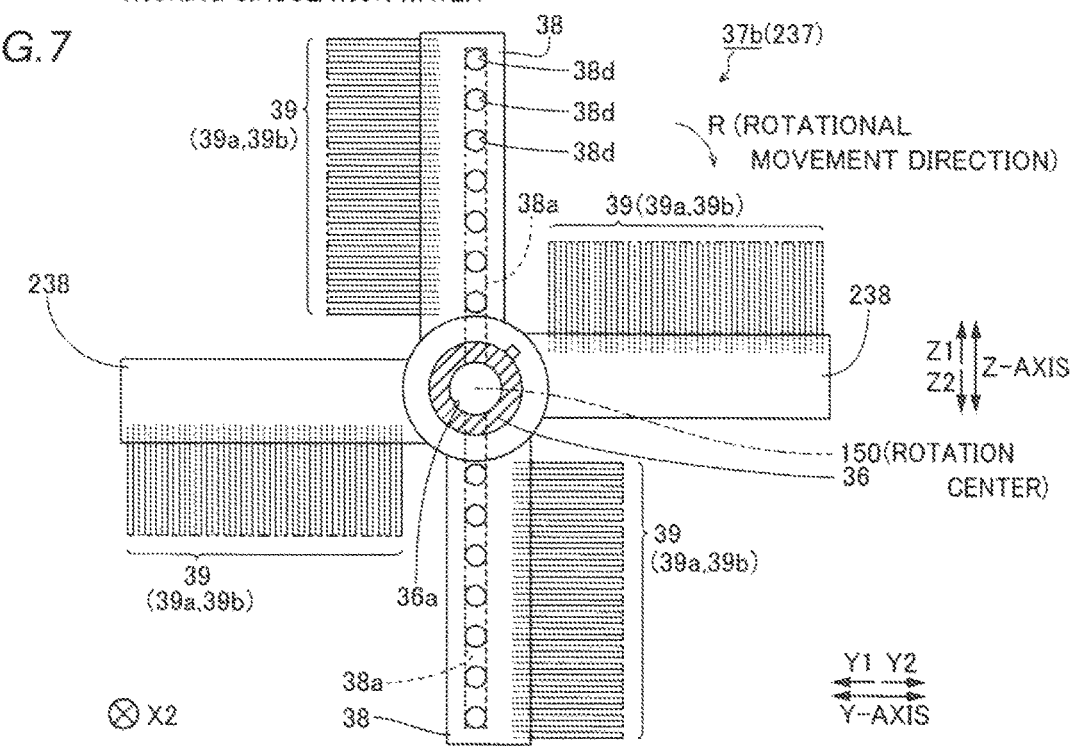

ABSORPTION HEAT PUMP DEVICE

TECHNICAL FIELD

The present invention relates to an absorption heat pump device.

BACKGROUND ART

In general, an absorption heat pump device using an absorbing liquid capable of absorbing vapor during evaporation of a refrigerant is known, for example. Such an absorption heat pump device is disclosed in Japanese Patent Laid-Open No. 4-236079, for example.

Japanese Patent Laid-Open No. 4-236079 discloses an absorption refrigerator (absorption heat pump device) including a regenerator, a condenser, an evaporator, and an absorber. In the absorption refrigerator disclosed in Japanese Patent Laid-Open No. 4-236079, a heat exchanger having a heat transfer surface formed into an upward convex shape and that arcuately extends, through which cooling water flows, blades (application member) including a rotary shaft and being rotationally movable along the arcuate heat transfer surface, and an injection nozzle fixed to the top of the heat exchanger and that supplies the concentrated solution (absorbing liquid) are provided in the absorber. When the concentrated solution supplied from the injection nozzle to the top of the heat exchanger naturally flows down onto the heat transfer surface (flow-down surface), the blades rotationally move such that the concentrated solution spreads over the heat transfer surface. Thus, a thin film of the concentrated solution absorbs refrigerant vapor from the evaporator, and absorption heat at the time of absorption is taken away by the cooling water through the heat transfer surface. After the concentrated solution spread over the heat transfer surface by the blades that rotationally rotate is diluted by absorbing the refrigerant vapor, the concentrated solution is immediately transferred to the outside from a lower end of the heat exchanger through a diluted solution outlet.

PRIOR ART

Patent Document

Patent Document 1: Japanese Patent Laid-Open No. 4-236079

SUMMARY OF THE INVENTION

Problems to be Solved by the Invention

In the absorber included in the absorption refrigerator disclosed in Japanese Patent Laid-Open No. 4-236079, the injection nozzle that supplies the concentrated solution is fixedly provided separately from the rotary shaft that rotationally moves the blades, and thus the concentrated solution supplied from the injection nozzle to the top of the heat exchanger may not be uniformly supplied to the heat transfer surface. When the heat exchanger (heat transfer surface) is stood vertically, for example, the concentrated solution only flows down from the injection nozzle, and there is a high possibility that the area of the heat transfer surface wet with the concentrated solution (an effective heat exchange area with the cooling water) is not sufficiently obtained even when the blades rotationally move. Therefore, it is necessary to increase the heat transfer area in order to obtain predetermined cooling performance, and there is a problem that the size of the heat exchanger is increased. Furthermore, after the concentrated solution that flows down onto the heat transfer surface is diluted by absorbing the refrigerant vapor, the concentrated solution is immediately transferred to the outside from the lower end of the heat transfer surface through the diluted solution outlet, and thus there is a high possibility that the diluted solution is not retained in the absorber for a sufficient period of time, does not sufficiently absorb the refrigerant vapor, and is delivered to the outside. In this case, in order to ensure its performance as an absorber, it is necessary to separately provide a circulation pump and a solution circulation circuit to pump the diluted solution (dilute liquid) again and supply the diluted solution to the top of the heat exchanger. However, there is a problem that separately providing the circulation pump and the solution circulation circuit leads to an increase in the size of the absorption heat pump device including the absorber.

The present invention has been proposed in order to solve the aforementioned problems, and an object of the present invention is to provide an absorption heat pump device capable of reducing its size while maintaining the performance of a heat exchanger.

Means for Solving the Problems

In order to attain the aforementioned object, an absorption heat pump device according to an aspect of the present invention is an absorption heat pump device, in which an absorbing liquid absorbs refrigerant vapor, and includes a heat exchange unit through which a heat exchange fluid flows, a rotor including a hollow rotary shaft member that includes a first internal flow path through which a solution including the absorbing liquid or a refrigerant flows, the rotor that discharges the solution in the first internal flow path by a centrifugal force as the rotary shaft member rotates, and an application member that moves with rotation of the rotor to apply the solution, which flows through the first internal flow path of the hollow rotary shaft member and is discharged, along a heat transfer surface of the heat exchange unit.

As described above, the absorption heat pump device according to this aspect of the present invention includes the rotor including the hollow rotary shaft member including the first internal flow path through which the solution flows, and that discharges the solution in the first internal flow path by the centrifugal force as the rotary shaft member rotates, and the application member that moves with rotation of the rotor to apply the solution, which flows through the first internal flow path of the hollow rotary shaft member and is discharged, along the heat transfer surface of the heat exchange unit. Thus, the solution that flows through the first internal flow path and is discharged by the centrifugal force of the rotor caused by rotation of the hollow rotary shaft member can be applied as a thin film onto the heat transfer surface of the heat exchange unit by the application member that moves together with the rotor. Therefore, regardless of the arrangement direction (inclination direction) of the heat transfer surface, it is possible to sufficiently ensure the area of the heat transfer surface wet with the solution (an effective heat exchange area with the heat exchange fluid) discharged from the rotor. That is, the solution can exchange heat with the heat exchange fluid with a sufficient wetting area, and thus the cooling performance of the absorbing liquid in an absorber or the evaporating performance of the refrigerant in an evaporator can be improved. In other words, it is possible to obtain the same heat exchange amount as that of the conventional one using a smaller heat exchange unit. In addition, the rotor including the hollow rotary shaft member including the first internal flow path through which the solution flows and that discharges the solution in the first internal flow path by the centrifugal force as the rotary shaft member rotates is provided such that it is not necessary to install a circulation pump that circulates a solution or a solution circulation circuit in the absorption heat pump device, or to provide a configuration that prevents a cavitation phenomenon occurring when a circulation pump is used. Thus, it is possible to reduce the size of the absorption heat pump device. Consequently, it is possible to reduce the size of the absorption heat pump device while maintaining the performance of a heat exchanger.

The aforementioned absorption heat pump device according to this aspect preferably further includes a solution supply hole that communicates with the first internal flow path and through which the solution is supplied to the heat transfer surface of the heat exchange unit or the application member by the centrifugal force caused by the rotation of the rotor.

According to this configuration, effectively using the centrifugal force caused by rotation of the rotor, the solution that flows through the first internal flow path can be directly supplied to the heat transfer surface of the heat exchange unit via the solution supply hole that communicates with the first internal flow path, or this solution can permeate through the application member and be applied onto the heat transfer surface of the heat exchange unit. Therefore, regardless of the arrangement direction (inclination direction) of the heat transfer surface, it is possible to reliably supply the solution to the heat transfer surface of the heat exchange unit or the application member.

In the aforementioned absorption heat pump device according to this aspect, the rotor preferably further includes a hollow rotary branch member connected to the rotary shaft member, that branches and extends outward in a rotational radial direction from the rotary shaft member, and to which the application member is fixed, the hollow rotary branch member preferably includes a second internal flow path connected to the first internal flow path, and the solution is preferably supplied to the heat transfer surface of the heat exchange unit via the first internal flow path of the rotary shaft member and the second internal flow path of the rotary branch member as the rotor rotates.

According to this configuration, effectively using the hollow rotary branch member rotationally moved and to which the application member is fixed, it is possible to continuously supply the solution that flows through the first internal flow path and the second internal flow path in this order to the heat transfer surface of the heat exchange unit along with rotational movement of the rotor (rotary branch member).

In the aforementioned configuration in which the rotor further includes the hollow rotary branch member, the application member that extends outward in the rotational radial direction from a rotation center side of the rotary shaft member is preferably fixed to the rotary branch member, the absorption heat pump device preferably further includes a solution supply hole connected to the second internal flow path of the rotary branch member and through which the solution is supplied to the heat transfer surface of the heat exchange unit, and the solution supply hole preferably includes a plurality of solution supply holes provided at a predetermined interval along a direction in which the application member extends.

According to this configuration, the solution that flows through the first internal flow path and the second internal flow path in this order can be uniformly supplied to the heat transfer surface of the heat exchange unit corresponding to the arrangement region of the application member moved with rotation of the rotor (hollow rotary branch member) via the plurality of solution supply holes provided at the predetermined interval along the direction in which the application member extends. Therefore, the solution supplied to the heat transfer surface of the heat exchange unit corresponding to the arrangement region of the application member can be efficiently applied onto the heat transfer surface of the heat exchange unit, using the application member moved with rotation of the rotor (follow rotary branch member).

In this case, the heat exchange unit preferably includes flat plate-like heat exchangers through which the heat exchange fluid flows and fixed at a predetermined interval along a transverse direction in which the hollow rotary shaft member extends, and the rotary branch member including the solution supply holes and the application member are preferably disposed in a region where the heat exchangers adjacent to each other face each other.

According to this configuration, the solution can be efficiently supplied to the heat transfer surfaces of the heat exchangers disposed on one side and the other side in the transverse direction, in which the rotary shaft member extends, with the rotary branch member as the center, and can be applied by the application member. That is, it is possible to improve the density of the heat exchange area between the solution and the heat exchange fluid (a heat transfer area per unit volume in the absorber or the evaporator), and thus it is possible to reduce the size of the heat exchange unit.

The aforementioned absorption heat pump device according to this aspect preferably further includes a solution reservoir provided in a container that houses the heat exchange unit and that stores the solution, and a solution delivery unit provided in the solution reservoir and that delivers the stored solution, and the solution delivery unit is preferably rotated with rotation of the rotor to draw up the solution from the solution reservoir and deliver the solution to the first internal flow path of the rotor.

According to this configuration, it is possible to discharge the solution from the solution delivery unit using rotation of the rotor and to continuously supply the solution to the rotor including the first internal flow path. Accordingly, the solution including the absorbing liquid or the refrigerant can be continuously applied onto the heat transfer surface of the heat exchange unit via the application member rotationally moved during rotation of the rotor. In addition, the solution delivery unit is rotated with rotation of the rotor, and thus there is no need to separately provide a liquid transfer pump, and it is possible to significantly reduce or prevent complication of the configuration of the absorption heat pump device.

In the aforementioned absorption heat pump device in which the flat plate-like heat exchangers are fixed at the predetermined interval along the transverse direction in which the hollow rotary shaft member extends, flow path sectional areas of second internal flow paths in hollow rotary branch members are preferably different from each other along the direction in which the rotary shaft member extends.

According to this configuration, it is possible to significantly reduce or prevent variations in the flow path resistance of the refrigerant that flows through the branch members in the second internal flow path in the branch member on the side closer to the solution delivery unit and the second internal flow path in the branch member on the farther side. Therefore, the refrigerant can be uniformly supplied to each of the heat transfer surfaces throughout the horizontally long heat exchange unit that extends along the direction in which the rotary shaft member extends.

In the aforementioned absorption heat pump device in which the plurality of solution supply holes are provided at the predetermined interval along the direction in which the application member extends, in the rotary branch member, opening areas of the plurality of solution supply holes on the rotation center side are preferably different from the opening areas of the plurality of solution supply holes on an outer side in the rotational radial direction.

According to this configuration, the opening areas of the solution supply holes are controlled such that it is possible to correct the uneven amount of solution (refrigerant or absorbing liquid) ejected in the rotational radial direction due to the centrifugal force.

In the aforementioned absorption heat pump device according to this aspect, the application member preferably removes the absorbing liquid or the refrigerant that has been heat-exchanged with the heat exchange fluid remaining on the heat transfer surface from the heat transfer surface, and newly applies the absorbing liquid or the refrigerant supplied from the first internal flow path of the rotary shaft member onto the heat transfer surface from which the heat-exchanged absorbing liquid or refrigerant has been removed.

According to this configuration, at the time of applying the absorbing liquid or the refrigerant by the application member, while the absorbing liquid or the refrigerant that has already been heat-exchanged is removed by the application member, and the heat transfer surface is updated, a new absorbing liquid or a new refrigerant can be reliably applied onto the updated heat transfer surface. Thus, the heat exchange unit can perform its function without decreasing its heat exchange performance.

In the aforementioned absorption heat pump device further including the solution reservoir and the solution delivery unit, the refrigerant is preferably stored in the solution reservoir, the solution delivery unit preferably delivers the refrigerant stored in the solution reservoir, and the solution delivery unit is preferably rotated through the rotation of the rotor to draw up the refrigerant from the solution reservoir and deliver the refrigerant to the first internal flow path of the rotor.

According to this configuration, it is possible to discharge the refrigerant from the solution delivery unit using rotation of the rotor and to continuously supply the refrigerant to the rotor including the first internal flow path. Accordingly, the refrigerant can be continuously applied onto the heat transfer surfaces of the heat exchangers by the application member rotationally moved during rotation of the rotor. In addition, the solution delivery unit is rotated with rotation of the rotor, and thus there is no need to provide a liquid transfer pump, and it is possible to significantly reduce or prevent complication of the configuration of the absorption heat pump device.

BRIEF DESCRIPTION OF THE DRAWINGS

FIG. 6 A sectional view showing the configuration of an evaporator according to a second embodiment of the present invention.

FIG. 7 A diagram showing the detailed structure of a rotor in the evaporator according to the second embodiment of the present invention.

MODES FOR CARRYING OUT THE INVENTION

Embodiments of the present invention are hereinafter described on the basis of the drawings.

First Embodiment

The configuration of an absorption heat pump device 100 according to a first embodiment of the present invention is now described with reference to FIGS. 1 to 5.

(Configuration of Absorption Heat Pump Device)

In the absorption heat pump device 100 according to the first embodiment of the present invention, a refrigerant (water) and an absorbing liquid (lithium bromide (LiBr) aqueous solution) are used. The absorption heat pump device 100 is mounted on a vehicle (not shown) and is applied to in-vehicle air conditioning. Furthermore, in the absorption heat pump device 100, the heat of high-temperature exhaust gas discharged from an engine 90 is used (recovered) to heat the absorbing liquid (dilute liquid).

Figure 1:
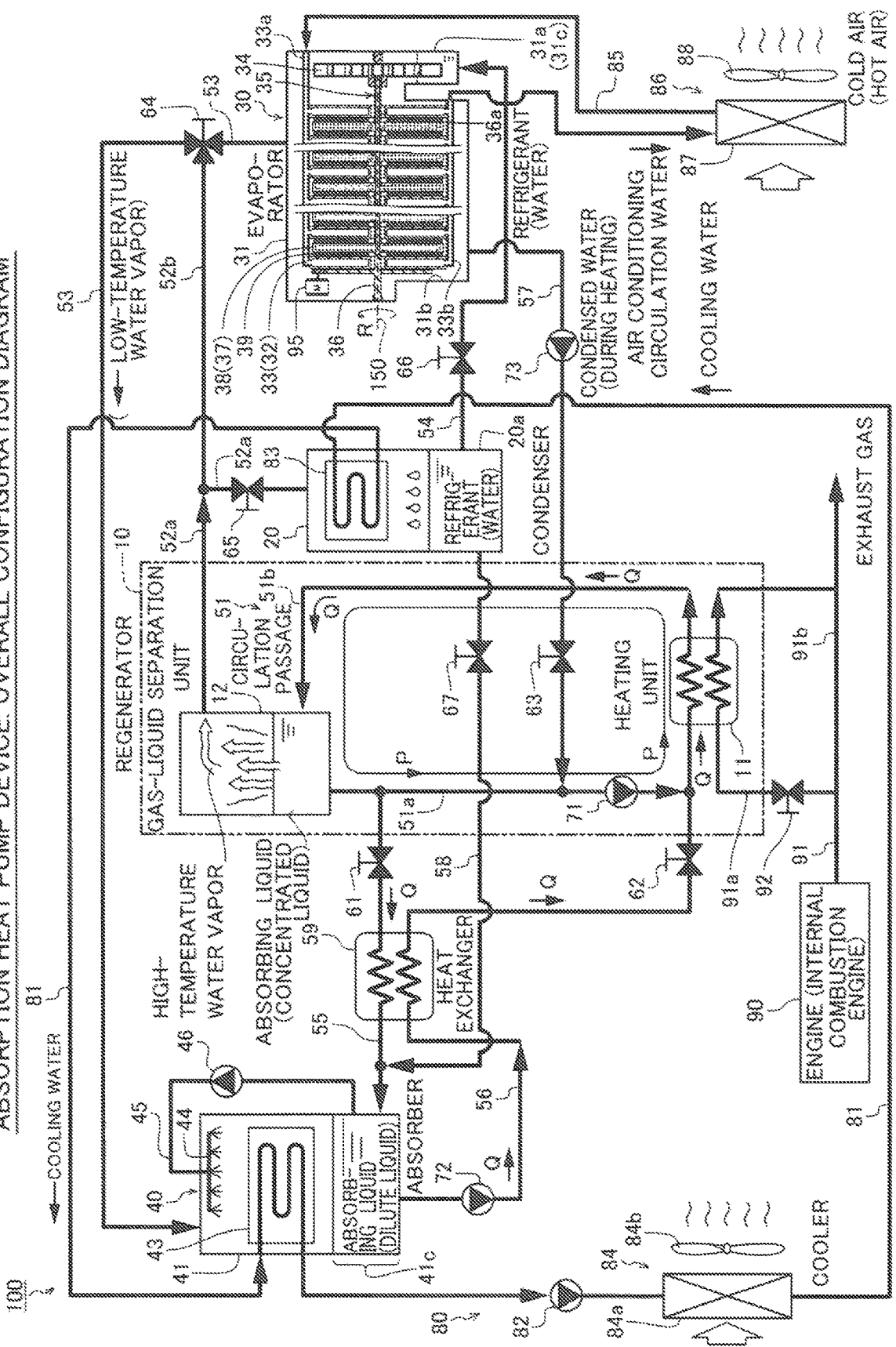
FIG. 1 A diagram showing the overall configuration of an absorption heat pump device according to a first embodiment of the present invention.

As shown in FIG. 1, the absorption heat pump device 100 includes a regenerator 10 (within a two-dot chain line frame), a condenser 20, an evaporator 30, and an absorber 40. The regenerator 10 performs a function of separating refrigerant vapor (high-temperature water vapor) from the absorbing liquid. The condenser 20 performs a function of condensing (liquefying) the refrigerant vapor during a cooling operation. The evaporator 30 performs a function of evaporating (vaporizing) the refrigerant that has become condensed water under low-temperature and low-pressure conditions during the cooling operation. The absorber 40 performs a function of absorbing the refrigerant vapor (low-temperature water vapor) vaporized by the evaporator 30 into the absorbing liquid supplied in a concentrated state.

The regenerator 10 includes a heating unit 11 that heats the absorbing liquid and a gas-liquid separation unit 12 that separates the refrigerant vapor from the heated absorbing liquid. In the heating unit 11, the high-temperature exhaust gas that flows through an exhaust pipe 91 from the engine 90 is heat-exchanged with the absorbing liquid. The exhaust pipe 91 includes an exhaust heat supply path 91*a* routed through the heating unit 11 and a detour path 91b, and a valve 92 is provided in the exhaust heat supply path 91a. The valve 92 is open during the cooling operation and during a heating operation such that the exhaust gas discharged from the engine 90 partially flows to the heating unit 11 through the exhaust heat supply path 91a.

The absorption heat pump device 100 also includes a circulation passage 51 including absorbing liquid circulation paths 51a and 51b, refrigerant vapor passages 52a, 52b, and 53, a refrigerant passage 54, absorbing liquid passages 55 and 56, and refrigerant supply paths 57 and 58. The circulation passage 51 performs a function of circulating the absorbing liquid between the heating unit 11 and the gas-liquid separation unit 12, and a pump 71 is provided in the absorbing liquid circulation path 51a. The refrigerant vapor passage 52a performs a function of supplying of the refrigerant vapor from the gas-liquid separation unit 12 to the condenser 20 during the cooling operation. The refrigerant vapor passage 52b performs a function of flowing the refrigerant vapor separated by the gas-liquid separation unit 12 into the evaporator 30 (functioning as a condenser in this case) during the heating operation. At a connection between the refrigerant vapor passage 52b and the refrigerant vapor passage 53, a three-way valve 64 capable of switching a state where the refrigerant vapor passage 52b is closed during the cooling operation and a state where a passage from the refrigerant vapor passage 52b to the evaporator 30 is open during the heating operation is provided. In addition, a valve 65 is provided in the refrigerant vapor passage 52a. The valve 65 performs a function of blocking the refrigerant vapor separated by the gas-liquid separation unit 12 from flowing into the condenser 20 during the heating operation. In addition, a valve 66 is provided in the refrigerant passage 54.

The absorbing liquid passage 55 performs a function of supplying the absorbing liquid (concentrated liquid) to the absorber 40 according to the opening and closing operation of a valve 61. The absorbing liquid passage 56 performs a function of supplying the absorbing liquid (dilute liquid), which has absorbed the refrigerant vapor in the absorber 40, to the circulation passage 51 during an interlocking operation between a pump 72 and a valve 62. The refrigerant supply path 57 performs a function of supplying of the refrigerant (condensed water) stored in the evaporator 30 (functioning as a condenser in this case) to the circulation passage 51 due to an interlocking operation between a pump 73 and a valve 63 during the heating operation. The refrigerant supply path 58 performs a function of directly supplying the condensed water stored in the condenser 20 to the absorber 40 according to the opening and closing operation of a valve 67 for the purpose of preventing crystallization. In a heat exchanger 59, heat exchange between the absorbing liquid that flows through the absorbing liquid passage 55 and the absorbing liquid that flows through the absorbing liquid passage 56 is performed.

The absorption heat pump device 100 also includes a cooling water circuit 80 driven during the cooling operation. The cooling water circuit 80 is used to cool the refrigerant vapor in the condenser 20 and to remove absorption heat generated during absorption of the refrigerant into the absorbing liquid in the absorber 40. Specifically, the cooling water circuit 80 includes a cooling water circulation path 81 through which cooling water (an example of a heat exchange fluid) flows, a pump 82, a heat exchange unit 83 disposed in the condenser 20, a heat exchange unit 43 (see FIG. 3) disposed in the absorber 40, and a heat radiation unit 84. In the heat radiation unit 84, the cooling water that flows through a heat exchange unit 84a is cooled (the heat is radiated) by air (outside air) blown by a blower 84b.

(Configuration of Evaporator)

Figure 2:
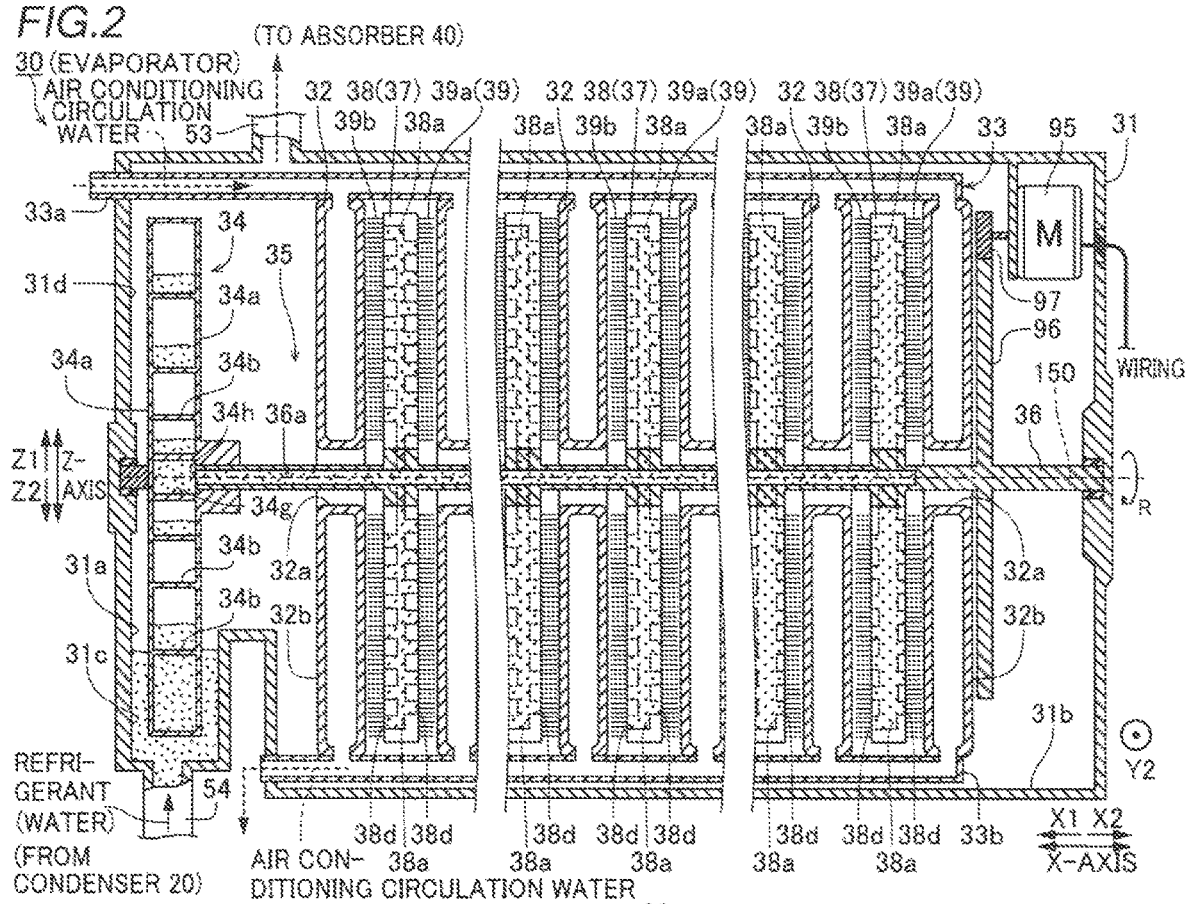
FIG. 2 A sectional view showing the configuration of an evaporator according to the first embodiment of the present invention.

According to the first embodiment, as shown in FIG. 2, the evaporator 30 includes a container 31 that maintains its interior in a vacuum state of an absolute pressure of 1 kPa or less, a heat exchange unit 33 integrally including ten flat plate-like (disc-shaped) heat exchangers 32 installed inside the container 31, a refrigerant delivery unit 34 (an example of a solution delivery unit) that pumps and conveys the refrigerant supplied into the container 31, a rotor 35 that supplies the refrigerant from the refrigerant delivery unit 34 to the heat exchange unit 33, and a motor 95 that rotates the rotor 35.

The container 31 includes a housing 31a that rotatably houses the refrigerant delivery unit 34 and a housing 31b that rotatably houses the rotor 35. The housing 31a includes a refrigerant reservoir 31c (an example of a solution reservoir) connected to the refrigerant passage 54, to which the refrigerant is supplied. The refrigerant vapor passage 53 is connected to the ceiling of the container 31. In the heat exchange unit 33, the ten heat exchangers 32 are aligned at equal pitch distances along an X-axis direction. In the heat exchange unit 33, the heat exchangers 32 are connected to each other by water pipes 33a and 33b at the top on the Z1 side and the bottom on the Z2 side. Each of the heat exchangers 32 includes a pass-through 32a having a central portion through which a shaft member 36 (an example of a rotary shaft member) that rotates the rotor passes. The water pipes 33a and 33b pass through an inner wall surface 31d and are connected to a circulation water circuit 85 (see FIG. 1). Thus, air conditioning circulation water (an example of a heat exchange fluid) that flows in from the water pipe 33a is distributed to each of the heat exchangers 32, flows through the heat exchangers 32 from the Z1 side to the Z2 side, gathers in the water pipe 33b, and returns to the circulation water circuit 85. In a heat exchange unit 86, air from a blower 88 (see FIG. 1) is cooled by the air conditioning circulation water that flows through a heat exchanger 87 (see FIG. 1). The cooled air is blown into the vehicle.

(Detailed Structure of Rotor)

Figure 3:
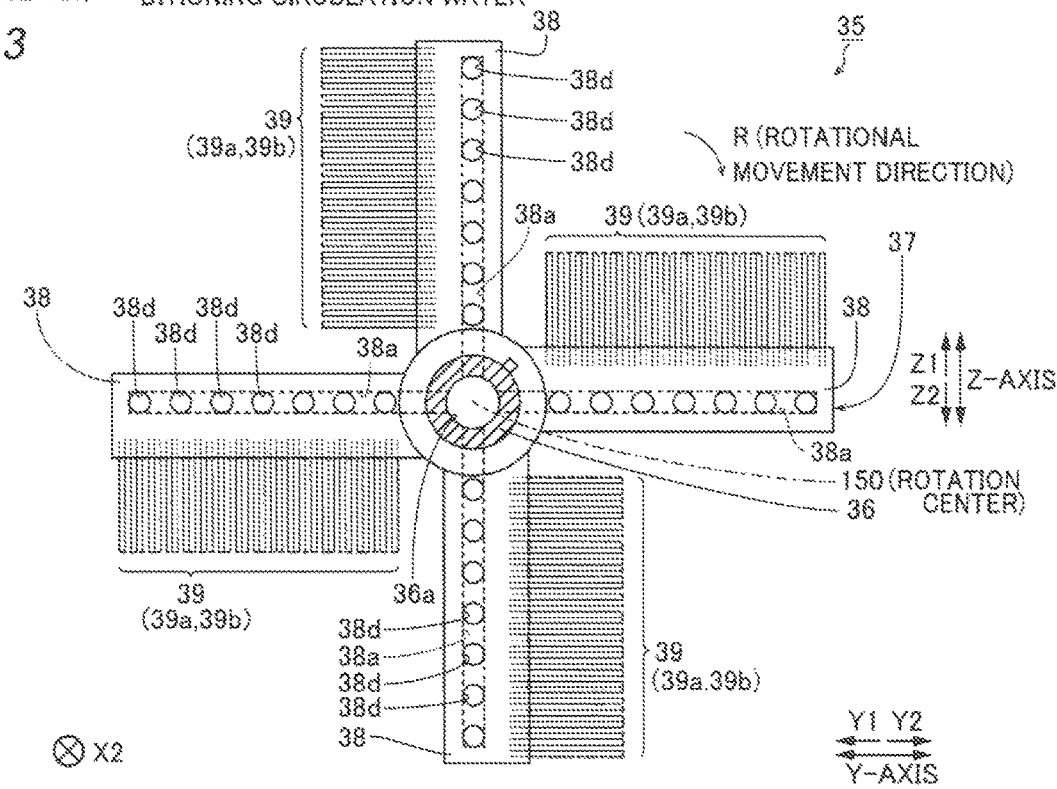
FIG. 3 A diagram showing the detailed structure of a rotor in the evaporator according to the first embodiment of the present invention.

As shown in FIGS. 2 and 3, the rotor 35 includes the shaft member 36, branch members 37 (examples of a rotary branch member), and brushes 39 (examples of an application member). The shaft member 36 has a hollow structure in which an internal flow path 36a (an example of a first internal flow path) that extends along an axis 150 is provided. An end of the shaft member 36 on one side (X1 side) is connected to a rotation center portion of the refrigerant delivery unit 34. One branch member 37 integrally includes four branches 38 that branch and extend outward in a rotational radial direction from the shaft member 36. The branches 38 disposed at 90-degree intervals each have a hollow structure in which an internal flow path 38a (an example of a second internal flow path) is provided. In FIGS. 2 and 3, the shape of the internal flow path 38a including a plurality of supply holes 38d described below is indicated by a broken line.

Figure 4:
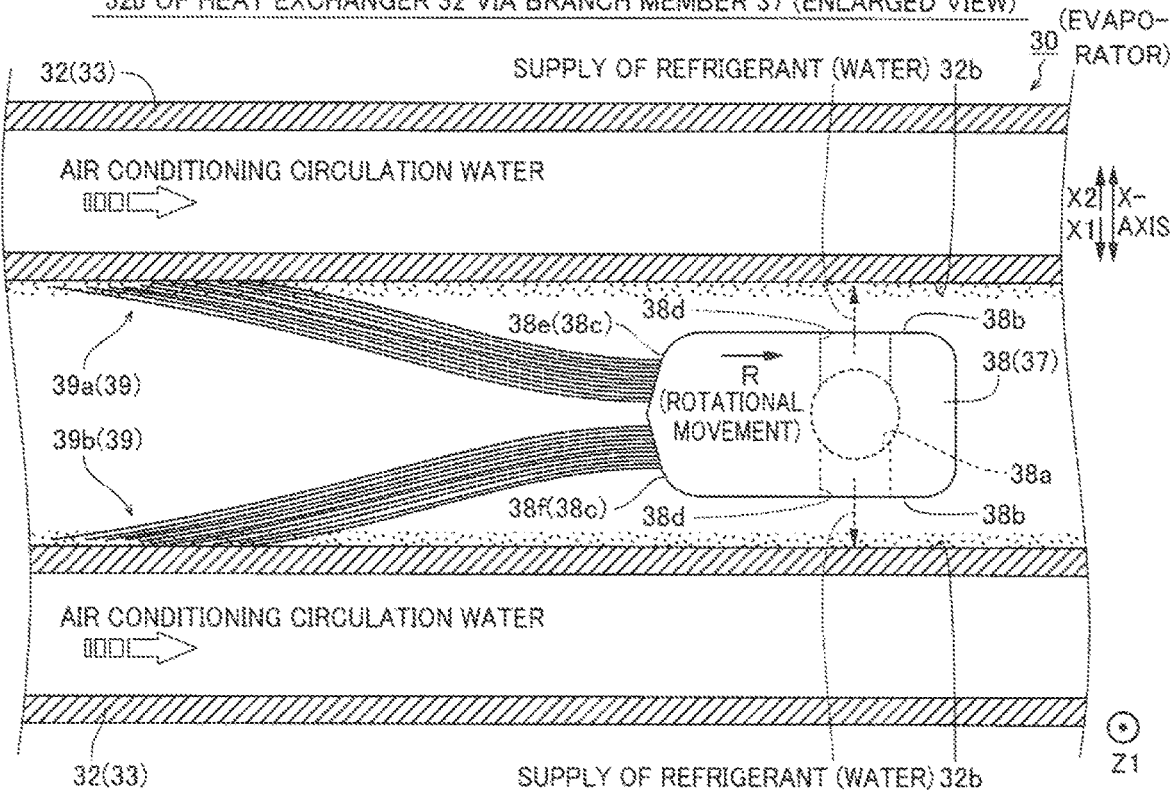
FIG. 4 A diagram showing a state of application of a refrigerant in the evaporator according to the first embodiment of the present invention.

Each of the branches 38 includes side surfaces 38b and 38c, as shown in FIG. 4. In the branch 38, the plurality of supply holes 38d (examples of a solution supply hole) that communicate with the internal flow path 38a are disposed in a row on the side surfaces 38b and open to the outside. In this case, as shown in FIG. 2, seven supply holes 38d that open to each of the side surface 38b on the X1 side (see FIG. 4) and the side surface 38b on the X2 side (see FIG. 4) are disposed at staggered heights in the longitudinal direction of the branch 38. In addition, a total of fourteen supply holes 38d have the same opening area. Furthermore, as shown in FIG. 4, the side surface 38c is formed in a chevron shape, and the brushes 39 (examples of an application member) in a bundle of resin fibers are fixed along inclined surfaces 38e and 38f inclined in opposite directions from the ridge. Therefore, a brush row 39a fixed to the inclined surface 38e and a brush row 39b fixed to the inclined surface 38f so as to extend outward in the rotational radial direction from the rotation center side of the shaft member 36 have an opening angle of about 30 degrees, and extend in an opposite direction to the rotational movement direction (arrow R direction) of the branch member 37. The brushes 39 (brush rows 39a and 39b) are arranged along a direction approximately parallel to heat transfer surfaces 32b of the heat exchangers 32, while the supply holes 38d extend in the X-axis direction perpendicular to the heat transfer surfaces 32b and face the heat transfer surfaces 32b.

Figure 5:
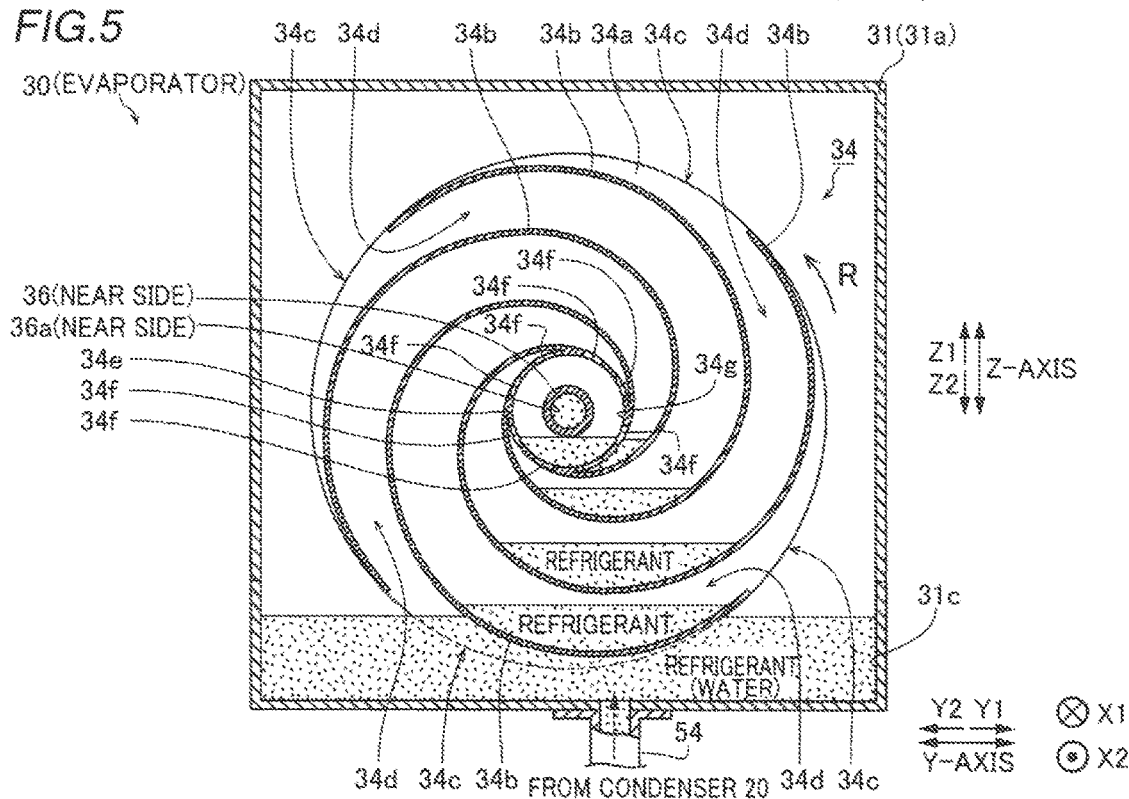
FIG. 5 A diagram showing the structure of a refrigerant delivery unit in the evaporator according to the first embodiment of the present invention.

As shown in FIGS. 2 and 5, the refrigerant delivery unit 34 includes a pair of disc-shaped plate-like members 34a and four blade members 34b sandwiched between the plate-like members 34a. Each of the blade members 34b spirally extends from the outer side toward the center side in the rotational radial direction of the refrigerant delivery unit 34. Thus, the refrigerant delivery unit 34 includes openings 34c that open to the outside between the plate-like members 34a and refrigerant transfer passages 34d that spirally extend from the outer side toward the center side in the rotational radial direction of the plate-like members 34a, taking the openings 34c as starting points. The refrigerant transfer passages 34d have a maximum flow path sectional area at the openings 34c and extend toward the rotation center while reducing its flow path sectional area. Furthermore, the plate-like members 34a are connected to an annular connecting member 34e disposed at the rotation center. Ends of the blade members 34b on the side opposite to the openings 34c are connected to the connecting member 34e. The connecting member 34e includes a plurality of communication holes 34f, and the refrigerant transfer passages 34d communicate with an internal space 34g of the connecting member 34e via the communication holes 34f.

As shown in FIG. 2, a discharge hole 34h that penetrates in the X-axis direction is provided in a central portion of the plate-like member 34a on the X2 side, and the discharge hole 34h is connected to the internal flow path 36a of the shaft member 36. Refrigerant (water) is stored in the refrigerant reservoir 31c, and a lower portion (Z2 side) of the refrigerant delivery unit 34 is immersed in the refrigerant reservoir 31c. A gear member 96 is attached to the outside of a heat exchanger 32 closest to the X2 side of the shaft member 36. A gear member 97 that meshes with the gear member 96 is attached to a drive shaft of the motor 95. According to the first embodiment, in the evaporator 30, the refrigerant delivery unit 34 is rotated with rotation of the shaft member 36 driven by the motor 95. Thus, the refrigerant is drawn up from the refrigerant reservoir 31c, is collected in the internal space 34g, and is delivered from the internal space 34g to the internal flow path 36a of the rotor 35 via the discharge hole 34h. Furthermore, as the shaft member 36 rotates, the rotor 35 is also rotated about the axis 150. Therefore, effectively using a centrifugal force caused by rotation of the rotor 35, the refrigerant that flows through the internal flow path 36a of the shaft member 36 in an arrow X2 direction divides into the internal flow paths 38a of the branch member 37 (four branches 38). Under the centrifugal force caused by rotation of the rotor 35, the refrigerant flows outward in the rotational radial direction along the internal flow paths 38a in the respective branches 38, and is directly supplied (discharged) to the heat transfer surfaces 32b of the heat exchangers 32 via the plurality of distal supply holes 38d. As shown in FIG. 4, immediately after the refrigerant is supplied to the heat transfer surfaces 32b, the refrigerant is applied as a thin film onto each of the heat transfer surfaces 32b of the ten heat exchangers 32 by the brushes 39 rotationally moved in the arrow R direction. Even when a small amount of refrigerant is stored in the refrigerant reservoir 31c, the refrigerant is continuously (actively) drawn up by the refrigerant delivery unit 34, and is supplied to the heat exchange unit 33 via the rotor 35. Therefore, effective evaporation is performed in the evaporator 30 even with a small amount of refrigerant.

As shown in FIG. 2, among nine branch members 37 (see FIG. 3) aligned along the X-axis direction, three branch members 37 from the side (X1 side) closer to the refrigerant delivery unit 34 are constructed such that the flow path sectional areas of the internal flow paths 38a in the branches 38 are relatively small (narrow). The next three branch members 37 are constructed such that the flow path sectional areas of the internal flow paths 38a in the branches 38 are medium. The remaining three branch members 37 are constructed such that the flow path sectional areas of the internal flow paths 38a in the branches 38 are relatively large (wide). Accordingly, as the branch members 37 are distanced in the arrow X2 direction from the refrigerant delivery unit 34, the flow path sectional areas of the internal flow passages 38a in the branches 38 are wide, and thus variations in the flow path resistance of the refrigerant that flows through the branch members 37 on the side (X1 side) closer to the refrigerant delivery unit 34 and the farther side (X2 side) are significantly reduced or prevented. Therefore, the refrigerant is supplied from the nine branch members 37 to the heat transfer surfaces 32b at the same momentum.

As shown in FIG. 1, the absorber 40 is kept in a vacuum state (an absolute pressure of 1 kPa or less). The absorber 40 includes a container 41 including an absorbing liquid reservoir 41c in which an absorbing liquid (a dilute liquid diluted by absorption of the refrigerant into the concentrated liquid) is mainly stored, the heat exchange unit 43, an injector 44 attached in the vicinity of the internal ceiling of the container 41, and an absorbing liquid transfer pipe line 45 and a pump 46 provided outside the absorber 40 and that connect the absorbing liquid reservoir 41c to the injector 44. Thus, the absorbing liquid in the absorbing liquid reservoir 41c is pumped by the pump 46 and is sprayed from the injector 44 toward the heat exchange unit 43. Therefore, during the cooling operation, the refrigerant vapor (low-temperature water vapor) generated in the evaporator 30 and suctioned through the refrigerant vapor passage 53 and the sprayed absorbing liquid (concentrated liquid) are mixed in the absorber 40 such that the absorbing liquid is diluted and stored in the absorbing liquid reservoir 41c.

(Operation During Cooling Operation)

During the cooling operation, as shown in FIG. 1, the pump 71 is started with the valves 61 and 62 closed, and the absorbing liquid circulates through the circulation passage 51 in an arrow P direction. When the refrigerant vapor, the temperature of which is raised by the heating unit 11, separated by the gas-liquid separation unit 12 reaches a predetermined temperature, the valves 61 and 62 are opened, and the pump 72 is started. Thus, the LiBr concentrated liquid stored in the gas-liquid separation unit 12 flows also through the absorbing liquid passages 55 and 56 in an arrow Q direction. Furthermore, the three-way valve 64 is switched to the side on which the gas-liquid separation unit 12 and the condenser 20 communicate with each other, and the refrigerant vapor condensed in the condenser 20 flows into the evaporator 30 through the refrigerant vapor passage 52, and the air inside the vehicle is cooled through the heat exchange unit 86. The refrigerant vapor evaporated in the heat exchange unit 33 is suctioned into the absorber 40 through the refrigerant vapor passage 53. In the absorber 40, the refrigerant vapor is absorbed by the absorbing liquid (concentrated liquid) supplied to the heat exchange unit 43 such that the absorbing liquid becomes a dilute liquid, and is stored in the absorbing liquid reservoir 41*c*. The dilute liquid stored in the absorbing liquid reservoir 41*c* flows through the absorbing liquid passage 55, and returns to the circulation passage 51.

(Operation During Heating Operation)

During the heating operation, the valves 61 and 62 are constantly closed, and the absorber 40 is not used. The three-way valve 64 is switched to the side on which the gas-liquid separation unit 12 and the evaporator 30 communicate with each other, and the valve 65 is closed. Immediately after the start of operation, the absorbing liquid circulates through the circulation passage 51, the temperature of the absorbing liquid is raised, the high-temperature water vapor separated by the gas-liquid separation unit 12 flows directly into the evaporator 30, and the air inside the vehicle is warmed through the heat exchange unit 86. The condensed water cooled in the evaporator 30 returns to the circulation passage 51 through the refrigerant supply path 57 due to the interlocking operation between the pump 73 and the valve 63.

Advantageous Effects of First Embodiment

According to the first embodiment, the following advantageous effects are achieved.

According to the first embodiment, as described above, the rotor 35 including the hollow shaft member 36 including the internal flow path 36*a* through which the refrigerant (water) flows and that discharges the refrigerant in the internal flow path 36*a* by the centrifugal force as the shaft member 36 rotates, and the brushes 39 that move with rotation of the rotor 35 to apply the refrigerant, which flows through the internal flow path 36*a* and is discharged, along the heat transfer surfaces 32*b* of the heat exchangers 32 are provided in the evaporator 30. Thus, the refrigerant that flows through the internal flow path 36*a* and is discharged to the heat exchangers 32 by the centrifugal force of the rotor 35 caused by rotation of the shaft member 36 can be applied as a thin film onto the heat transfer surfaces 32*b* by the brushes 39 that move together with the rotor 35. Therefore, regardless of the inclination (arrangement) direction of the heat exchangers 32, it is possible to sufficiently ensure the area of the heat transfer surfaces 32*b* wet with the refrigerant (an effective heat exchange area with the air conditioning circulation water) discharged from the rotor 35. That is, the refrigerant can exchange heat with the air conditioning circulation water with a sufficient wetting area, and thus the evaporating performance of the refrigerant can be improved. In other words, it is possible to obtain the same heat exchange amount using a smaller heat exchange unit 33. In addition, the rotor 35 including the hollow shaft member 36 including the internal flow path 36*a* through which the refrigerant flows and that discharges the refrigerant in the internal flow path 36*a* by the centrifugal force as the shaft member 36 rotates is provided such that it is not necessary to install a circulation pump that circulates a refrigerant or a refrigerant circulation circuit or to provide a configuration that prevents a cavitation phenomenon occurring when a circulation pump is used in the evaporator 30. Consequently, it is possible to reduce the size of the absorption heat pump device 100 while maintaining the heat exchange performance of the evaporator 30.

According to the first embodiment, the absorption heat pump device 100 includes the supply holes 38*d* that communicate with the internal flow path 36*a* and through which the refrigerant is supplied to the heat transfer surfaces 32*b* of the heat exchangers 32 by the centrifugal force caused by rotation of the rotor 35. Thus, effectively using the centrifugal force caused by rotation of the rotor 35, the refrigerant that flows through the internal flow path 36*a* can be directly supplied to the heat transfer surfaces 32*b* of the heat exchangers 32 via the supply holes 38*d* that communicate with the internal flow path 36*a*. Therefore, regardless of the arrangement direction (inclination direction) of the heat transfer surfaces 32*b*, it is possible to reliably supply the refrigerant to the heat transfer surfaces 32*b* of the heat exchangers 32.

According to the first embodiment, the rotor 35 includes the hollow branch members 37 connected to the shaft member 36, that branch and extend outward in the rotational radial direction from the shaft member 36, and to which the brushes 39 are fixed. Furthermore, the branch members 37 include the internal flow paths 38*a* connected to the internal flow path 36*a*, and supply the refrigerant to the brushes 39 via the internal flow paths 36*a* and 38*a* as the rotor 35 rotates. Thus, effectively using the branch members 37 rotationally moved and to which the brushes 39 are fixed, it is possible to continuously supply the refrigerant that flows through the internal flow paths 36*a* and 38*a* in this order to the heat transfer surfaces 32*b* of the heat exchangers 32 along with rotational movement of the branch members 37 (branches 38).

According to the first embodiment, the brushes 39 that extend outward in the rotational radial direction from the rotation center side of the shaft member 36 are fixed to the branches 38. Furthermore, the plurality of supply holes 38*d* are provided at the predetermined intervals along a direction in which the brushes 39 extend. Thus, the refrigerant that flows through the internal flow paths 36*a* and 38*a* in this order can be uniformly supplied to the heat transfer surfaces 32*b* of the heat exchangers 32 corresponding to the arrangement regions of the brushes 39 moved with rotation of the branch members 37 (branches 38) via the supply holes 38*d* provided at the predetermined intervals in the direction in which the brushes 39 extend. Therefore, the refrigerant supplied to the heat transfer surfaces 32*b* corresponding to the arrangement regions of the brushes 39 can be efficiently applied onto the heat transfer surfaces 32*b*, using the brushes 39 moved with rotation of the branches 38.

According to the first embodiment, in the heat exchange unit 33, the flat plate-like heat exchangers 32 through which the air conditioning circulation water flows are fixed at the equal pitch distances along a transverse direction in which the hollow shaft member 36 extends, and the branch member 37 including the supply holes 38*d* and the brushes 39 are disposed in each of regions where the heat exchangers 32 adjacent to each other face each other. Thus, the refrigerant can be efficiently supplied to the heat transfer surfaces 32*b* of the heat exchangers 32 disposed on one side and the other side in the transverse direction, in which the shaft member 36 extends, with the branch member 37 as the center, and can be applied by the brushes 39. That is, it is possible to improve a density of heat exchange between the refrigerant and the air conditioning circulation water (a heat transfer area per unit volume in the evaporator 30), and thus it is possible to reduce the size of the heat exchange unit 33.

According to the first embodiment, the absorption heat pump device 100 includes the refrigerant reservoir 31c and the refrigerant delivery unit 34 provided in the refrigerant reservoir 31c. Furthermore, the refrigerant delivery unit 34 uses rotation of the rotor 35 to rotate such that the refrigerant is drawn up from the refrigerant reservoir 31c and is delivered to the internal flow path 36a of the rotor 35. Thus, it is possible to discharge the refrigerant from the refrigerant delivery unit 34 using rotation of the rotor 35 and to continuously supply the refrigerant to the rotor 35 including the internal flow path 36a. Accordingly, the refrigerant can be continuously applied onto the heat transfer surfaces 32b of the heat exchangers 32 by the brushes 39 rotationally moved during rotation of the rotor 35. In addition, the refrigerant delivery unit 34 is rotated with rotation of the rotor 35, and thus there is no need to provide a liquid transfer pump, and it is possible to significantly reduce or prevent complication of the configuration of the absorption heat pump device 100.

According to the first embodiment, the flow path sectional areas (the width of the flow path) of the internal flow paths 38a in the nine branch members 37 are different from each other along the X-axis direction in which the shaft member 36 extends. Thus, it is possible to significantly reduce or prevent variations in the flow path resistance of the refrigerant that flows through the branch members 37 in the internal flow paths 38a in the branches 38 of the branch member 37 on the side (X1 side) closer to the refrigerant delivery unit 34 and the internal flow paths 38a in the branches 38 of the branch member 37 on the farther side (X2 side). Therefore, the refrigerant can be uniformly supplied to each of the heat transfer surfaces 32b throughout the horizontally long heat exchange unit 33 that extends along the X-axis direction.

Second Embodiment

A second embodiment is now described with reference to FIGS. 6 and 7. In this second embodiment, an example in which the number of branches 38 provided with internal flow paths 38a is different for each branch member 237 is described. In the figures, the same configurations as those of the aforementioned first embodiment are denoted by the same reference numerals.

An absorption heat pump device according to the second embodiment includes an evaporator 230. As shown in FIG. 6, in a rotor 235 rotatably installed in the evaporator 230, among nine branch members 237 (examples of a rotary branch member) aligned in an X-axis direction, three branch members 37a from the X1 side closer to a refrigerant delivery unit 34 each include an internal flow path 38a only in one of four branches 38, and the remaining three branches 238 each include a brush 39 not an internal flow path 38a. Furthermore, in the next three branch members 37b, two of four branches 38 each include only an internal flow path 38a, and the remaining two branches 238 each include only a brush 39 not an internal flow path 38a. The remaining three branch members 37c each include internal flow paths 38a in all of four branches 238. As shown in FIG. 7, in the branch members 37b, the branches 38 including the internal flow path 38a and the branches 238 having a solid structure are alternately disposed at 90-degree intervals. In the rotor 235, the flow path sectional areas of the internal flow paths 38a of the branches 38 in the branch members 37a to 37c are equal to each other. The remaining configurations of the absorption heat pump device according to the second embodiment are similar to those of the first embodiment.

Advantageous Effects of Second Embodiment

According to the second embodiment, as described above, the number of internal flow paths 38a in the branch members 237 is increased to one, two, and four as a distance from the refrigerant delivery unit 34 increases. Thus, it is possible to significantly reduce or prevent variations in the flow path resistance of the refrigerant that flows through the branch members 37a to 37c in the internal flow paths 38a in the branches 38 on the side (X1 side) closer to the refrigerant delivery unit 34 and the internal flow paths 38a in the branches 38 on the farther side (X2 side). Therefore, the refrigerant can be uniformly supplied to heat transfer surfaces 32b throughout a horizontally long heat exchange unit 33 that extends along the X-axis direction.

Third Embodiment

Figure 8:
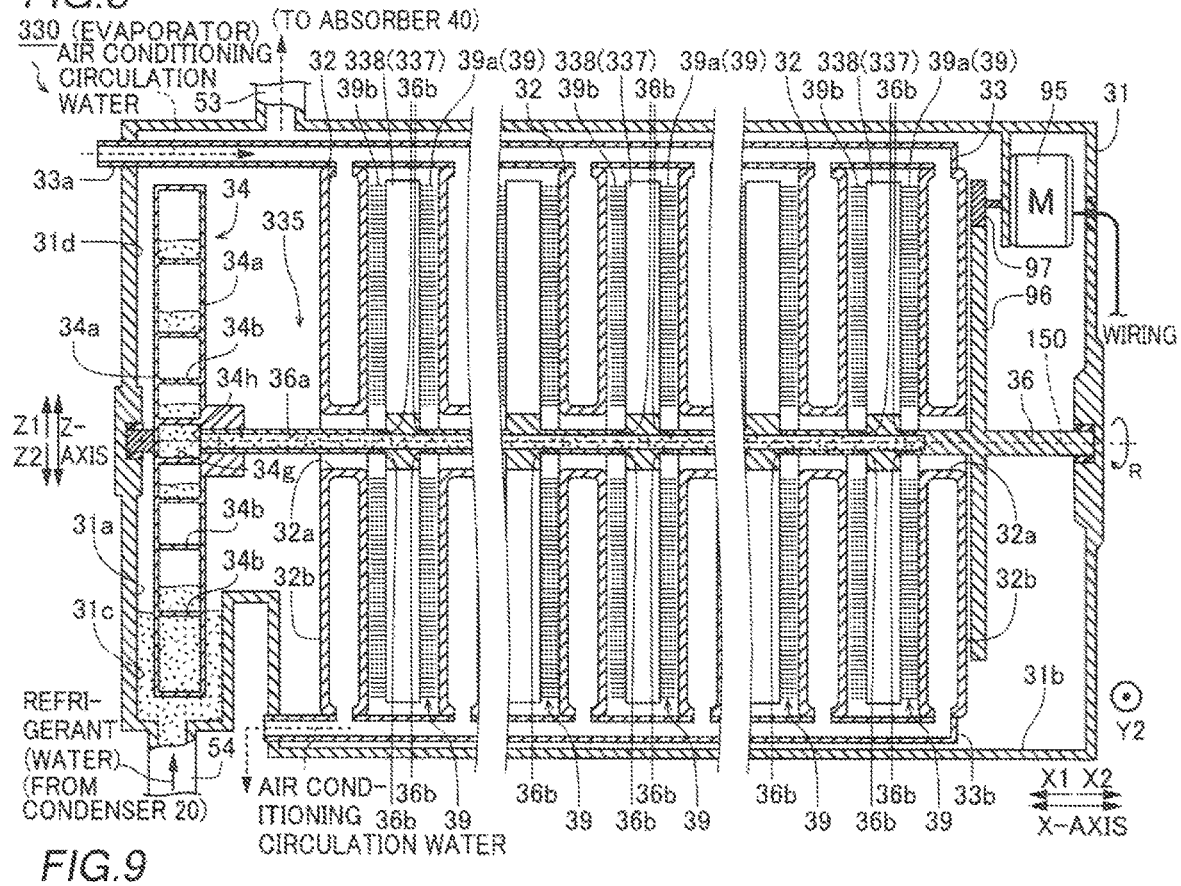
FIG. 8 A sectional view showing the configuration of an evaporator according to a third embodiment of the present invention.

A third embodiment is now described with reference to FIGS. 2 and 8. In this third embodiment, an example in which each of branch members 337 does not include an internal flow path 38a in each of branches 338 is described. In the figures, the same configurations as those of the aforementioned first embodiment are denoted by the same reference numerals.

An absorption heat pump device according to the third embodiment includes an evaporator 330. Furthermore, as shown in FIG. 8, a rotor 335 installed in the evaporator 330 does not include internal flow paths in any of nine branch members 337. On the other hand, in a hollow shaft member 36, a plurality of supply holes 36b (examples of a solution supply hole) are provided in the vicinity of portions to which the branch members 337 are attached. The supply holes 36b communicate with an internal flow path 36a and open to the outer surface of the shaft member 36. In addition, the supply holes 36b perform a function of supplying a refrigerant to the bases of brushes 39.

Thus, according to the third embodiment, the refrigerant that flows through the internal flow path 36a of the shaft member 36 in an arrow X2 direction is supplied to the brushes 39 through the respective supply holes 36b by a centrifugal force caused by rotation of the rotor 335 (shaft member 36). When the brushes 39 are rotationally moved, the refrigerant permeates throughout brush rows 39a and brush rows 39b while flowing outward in the rotational radial direction at the bases of the brushes 39 due to its own weight. Then, the brushes 39 through which the refrigerant has permeated are rotationally moved along heat transfer surfaces 32b of a heat exchange unit 33 (ten heat exchangers 32) such that the refrigerant is applied onto the heat transfer surfaces 32b.

Advantageous Effects of Third Embodiment

According to the third embodiment, as described above, the supply holes 36b that communicate with the internal flow path 36a and through which the refrigerant is supplied to the brushes 39 by the centrifugal force caused by rotation of the rotor 335 are provided in the shaft member 36. Thus, using the centrifugal force caused by rotation of the rotor 335 (shaft member 36), the refrigerant that flows through the internal flow path 36a of the shaft member 36 can easily permeate through the brushes 39 via the supply holes 36b that communicate with the internal flow path 36a. Therefore, regardless of the inclination (arrangement) direction of the heat transfer surfaces 32b of the heat exchangers 32, it is possible to reliably supply the refrigerant to the brushes 39.

Fourth Embodiment

A fourth embodiment is now described with reference to FIGS. 1 and 9. In this fourth embodiment, an example in which the same internal configuration as an evaporator 30 is applied to an absorber 440 is described.

Figure 9:
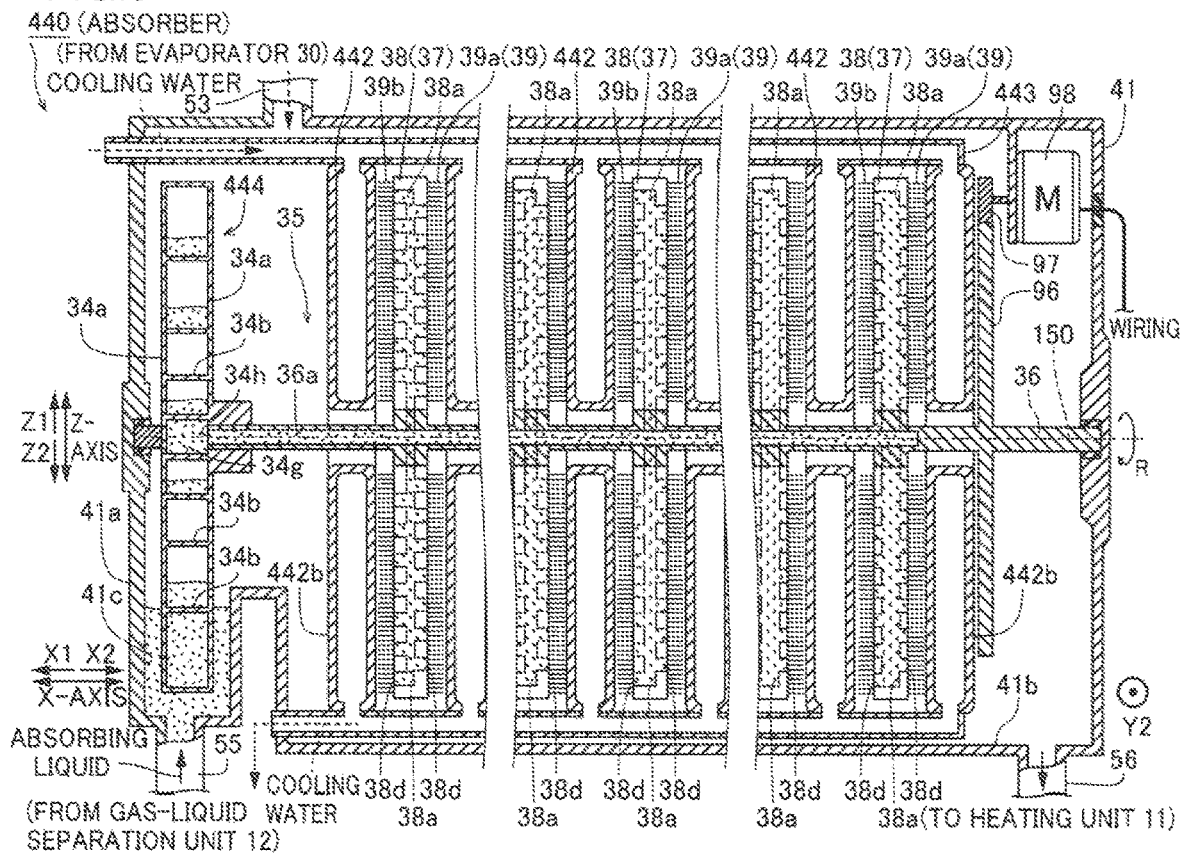
FIG. 9 A sectional view showing the configuration of an absorber according to a fourth embodiment of the present invention.

As shown in FIG. 9, in the absorber 440 of an absorption heat pump device according to the fourth embodiment, a rotor 35 and an absorbing liquid delivery unit 444 (an example of a solution delivery unit) are rotationally moved with respect to a heat exchange unit 443 inside a container 41. The constituent elements of the rotor 35 are substantially the same as those of the aforementioned first embodiment. The heat exchange unit 443 includes fifteen heat exchangers 442, and the rotor 35 includes fourteen branch members 37. Furthermore, the absorber 440 does not include an injector 44, an absorbing liquid transfer pipe line 45, or a pump 46 (see FIG. 1).

The container 41 includes a housing 41a that rotatably houses the absorbing liquid delivery unit 444 and a housing 41b that rotatably houses the rotor 35. The housing 41a is connected to an absorbing liquid passage 55, and an absorbing liquid is supplied to an absorbing liquid reservoir 41c (an example of a solution reservoir). The housing 41b is connected to an absorbing liquid passage 56. The ceiling of the container 41 is connected to a refrigerant vapor passage 53.

Therefore, in the absorber 440, the absorbing liquid delivery unit 444 is rotated with rotation of a shaft member 36 driven by a motor 98. Thus, the absorbing liquid is drawn up from the absorbing liquid reservoir 41c and is collected in an internal space 34g, and then is delivered to an internal flow path 36a of the rotor 35. In addition, effectively using a centrifugal force caused by rotation of the rotor 35, the absorbing liquid that flows through the internal flow path 36a along with rotation of the rotor 35 flows through internal flow paths 38a of branch members 37 (branches 38), and is supplied to heat transfer surfaces 442b of the heat exchangers 442 via distal supply holes 38d. Immediately after the absorbing liquid is supplied to the heat transfer surfaces 442b, the absorbing liquid is applied as a thin film onto the respective heat transfer surfaces 442b of the fifteen heat exchangers 442 by brushes 39 that rotationally move in an arrow R direction.

When the brushes 39 are moved along the heat transfer surfaces 442b of the heat exchange unit 443, the absorbing liquid (a LiBr aqueous solution diluted by absorbing a relatively large amount of refrigerant) that has been heat-exchanged with cooling water remaining on the heat transfer surfaces 442b is removed from the heat transfer surfaces 442b, and the absorbing liquid supplied from the internal flow path 36a of the shaft member 36 is newly applied onto the heat transfer surfaces 442b from which the heat-exchanged absorbing liquid has been removed. The lithium bromide aqueous solution (absorbing liquid) generally has a large surface tension, and thus the wettability to the heat transfer surfaces 442b is low. However, the absorbing liquid can be continuously sprayed from a plurality of supply holes 38d to the heat transfer surfaces 442b, and can be immediately spread and applied by the brushes 39, and thus the wettability of the absorbing liquid to the heat transfer surfaces 442b is effectively improved. Furthermore, the improvement of the wettability leads to improvement of heat exchange performance between the absorbing liquid and the cooling water in the heat exchange unit 443. The remaining configurations of the absorption heat pump device according to the fourth embodiment are similar to those of the aforementioned first embodiment.

Advantageous Effects of Fourth Embodiment

According to the fourth embodiment, as described above, the absorber 440 includes the rotor 35 and the absorbing liquid delivery unit 444. Thus, the absorbing liquid that flows through the internal flow path 36a and is discharged to the heat exchangers 442 by the centrifugal force as the shaft member 35 rotates can be applied as a thin film onto the heat transfer surfaces 442b of the heat exchangers 442 by the brushes 39 that move together with the rotor 35. Also in this case, it is possible to sufficiently ensure (improve) the area of the heat transfer surfaces 442b wet with the absorbing liquid discharged from the rotor 35 regardless of the inclination direction of the heat transfer surfaces 442b, and thus it is possible to improve the cooling performance of cooling the absorbing liquid (dilute liquid) in the absorber 440. Furthermore, it is not necessary to provide a pump 46 that circulates the absorbing liquid and an absorbing liquid transfer pipe line 45 (see FIG. 1) in the absorber 440. Thus, it is possible to reduce the size of the absorption heat pump device while maintaining the heat exchange performance of the absorber 440.

According to the fourth embodiment, when the brushes 39 are moved along the heat transfer surfaces 442b of the heat exchange unit 443, the absorbing liquid (diluted LiBr aqueous solution) that has been heat-exchanged with the cooling water remaining on the heat transfer surfaces 442b is removed from the heat transfer surfaces 442b, and the absorbing liquid supplied from the internal flow path 36a of the shaft member 36 is newly applied onto the heat transfer surfaces 442b from which the heat-exchanged absorbing liquid has been removed. Thus, at the time of applying the absorbing liquid by the brushes 39, while the absorbing liquid (diluted LiBr aqueous solution) that has already been heat-exchanged is removed by the brushes 39, and the heat transfer surfaces 442b are updated, a new absorbing liquid (concentrated liquid) can be reliably applied onto the updated heat transfer surfaces 442b. Thus, the heat exchange unit 443 can perform its function without decreasing its heat exchange performance. The remaining advantageous effects of the fourth embodiment are similar to those of the aforementioned first embodiment.

Modified Examples

The embodiments disclosed this time must be considered as illustrative in all points and not restrictive. The range of the present invention is not shown by the above description of the embodiments but by the scope of claims for patent, and all modifications (modified examples) within the meaning and range equivalent to the scope of claims for patent are further included.

For example, while the fourteen supply holes 38d provided in one branch 38 (238) have the same opening area in each of the aforementioned first to fourth embodiments, the present invention is not restricted to this. That is, the opening areas of the supply holes 38d on the rotation center side may be different from the opening areas of the supply holes 38d on the outer side in the rotational radial direction. For example, the opening areas of the supply holes 38d may be gradually decreased from the rotation center side toward the outer side in the rotational radial direction. In this manner, the opening areas of the supply holes 38d are controlled such that it is possible to correct the uneven amount of solution (refrigerant or absorbing liquid) ejected in the rotational radial direction due to a centrifugal force. Furthermore, while the opening areas are kept unchanged, the arrangement intervals of the supply holes 38d aligned in a row in the branches 38 (238) may be gradually increased from the rotation center side to the outer side in the rotational radial direction.

While the four branches 38 (238) are provided in one branch member 37 (237, 337) in each of the aforementioned first to fourth embodiments, the present invention is not restricted to this. A plurality of branches 38 other than the four branches 38 such as three or five branches 38 may be provided in one branch member 37.

While the internal flow path 36a has a constant inner diameter in each of the aforementioned first to fourth embodiments, the present invention is not restricted to this. The inner diameter of the internal flow passage 36a on the side closer to the refrigerant delivery unit 34 may be different from the inner diameter of the internal flow passage 36a on the farther side for the purpose of equalizing the amount of liquid delivered to the branch member 37.

While the absorption heat pump device according to the present invention is applied to air conditioning of the vehicle in each of the aforementioned first to fourth embodiments, the present invention is not restricted to this. The present invention can be applied not only to the vehicle but also to a stationary absorption heat pump device that performs air conditioning of buildings, factories, commercial facilities, and the like.

While the example in which the absorbing liquid is heated using the heat of the exhaust gas of the engine 90 in each of the aforementioned first to fourth embodiments, the present invention is not restricted to this. The absorption heat pump device according to the present invention may be applied to air conditioning of a hybrid vehicle or an electric vehicle using an electric motor. The absorption heat pump device according to the present invention may be applied to air conditioning of passenger cars including a fuel cell system by using exhaust heat of batteries or motors of electric vehicles, exhaust heat at the time of power generation in fuel cells, etc. as a heat source for heating the absorbing liquid.

While water and a lithium bromide aqueous solution are used as the refrigerant and the absorbing liquid in each of the aforementioned first to fourth embodiments, the present invention is not restricted to this. In the absorption heat pump device 100, ammonia and water may be used as the refrigerant and the absorbing liquid, respectively.

DESCRIPTION OF REFERENCE NUMERALS 30, 230: evaporator
31, 41: container
31c: refrigerant reservoir (solution reservoir)
32, 442: heat exchanger
32b, 442b: heat transfer surface
33, 443: heat exchange unit
34: refrigerant delivery unit (solution delivery unit)
35, 235, 335: rotor
36: shaft member (rotary shaft member)
36a: internal flow path (first internal flow path)
36b, 38d: supply hole (solution supply hole)
37, 37a, 37b, 37c, 237, 337: branch member (rotary branch member)
38, 238, 338: branch
38a: internal flow path (second internal flow path)
39: brush (application member)
41c: absorbing liquid reservoir (solution reservoir)
100: absorption heat pump device
440: absorber
444: absorbing liquid delivery unit (solution delivery unit)

The invention claimed is:

1. An absorption heat pump device, in which an absorbing liquid absorbs refrigerant vapor, comprising:
    a heat exchange unit configured for flow of a heat exchange fluid therethrough;
    a rotor including a hollow rotary shaft member that includes a first internal flow path configured for flow of a solution including the absorbing liquid or a refrigerant therethrough, the rotor configured to discharge the solution in the first internal flow path by a centrifugal force as the rotary shaft member rotates;
    an application member configured to move with rotation of the rotor to apply the solution, which flows through the first internal flow path of the hollow rotary shaft member and is discharged, along a heat transfer surface of the heat exchange unit; and
    a solution supply hole that communicates with the first internal flow path and through which the solution is supplied to the heat transfer surface of the heat exchange unit by the centrifugal force caused by the rotation of the rotor, wherein
    the rotor further includes a hollow rotary branch member connected to the rotary shaft member, that branches and extends outward in a rotational radial direction from the rotary shaft member, and to which the application member is fixed;
    the hollow rotary branch member includes a second internal flow path connected to the first internal flow path; and
    the first internal flow path of the rotary shaft member and the second internal flow path of the rotary branch member are configured to supply the solution to the heat transfer surface of the heat exchange unit as the rotor rotates.

2. The absorption heat pump device according to claim 1, wherein
    the application member that extends outward in the rotational radial direction from a rotation center side of the rotary shaft member is fixed to the rotary branch member;
    the solution supply hole is connected to the second internal flow path of the rotary branch member and through which the solution is supplied to the heat transfer surface of the heat exchange unit; and
    the solution supply hole includes a plurality of solution supply holes provided at a predetermined interval along a direction in which the application member extends.

3. The absorption heat pump device according to claim 2, wherein
    the heat exchange unit includes flat plate-like heat exchangers through which the heat exchange fluid flows and fixed at a predetermined interval along a transverse direction in which the hollow rotary shaft member extends; and
    the rotary branch member including the solution supply holes and the application member are disposed in a region where the heat exchangers adjacent to each other face each other.

4. The absorption heat pump device according to claim 1, further comprising:
    a solution reservoir provided in a container that houses the heat exchange unit and that stores the solution; and a solution delivery unit provided in the solution reservoir and that delivers the stored solution; wherein the solution delivery unit is configured to rotate with rotation of the rotor to draw up the solution from the solution reservoir and deliver the solution to the first internal flow path of the rotor.

5. The absorption heat pump device according to claim 3, wherein the hollow rotary branch member includes a plurality of hollow rotary branch members including a plurality of the second internal flow paths, flow path sectional areas of which are different from each other along the direction in which the rotary shaft member extends.

6. The absorption heat pump device according to claim 2, wherein in the rotary branch member, opening areas of the plurality of solution supply holes on the rotation center side are different from the opening areas of the plurality of solution supply holes on an outer side in the rotational radial direction.

7. The absorption heat pump device according to claim 1, wherein the application member is configured to remove the absorbing liquid or the refrigerant that has been heat-exchanged with the heat exchange fluid remaining on the heat transfer surface from the heat transfer surface, and to newly apply the absorbing liquid or the refrigerant supplied from the first internal flow path of the rotary shaft member onto the heat transfer surface from which the heat-exchanged absorbing liquid or refrigerant has been removed.

8. The absorption heat pump device according to claim 4, wherein the refrigerant is stored in the solution reservoir;

the solution delivery unit is configured to deliver the refrigerant stored in the solution reservoir; and the solution delivery unit is configured to rotate through the rotation of the rotor to draw up the refrigerant from the solution reservoir and deliver the refrigerant to the first internal flow path of the rotor.

\* \* \* \* \*